United States Patent [19]
McDonald et al.

[11] Patent Number: 5,969,497
[45] Date of Patent: Oct. 19, 1999

[54] ELECTRIC MOTOR STARTING CIRCUIT

[75] Inventors: Stephen Paul McDonald; Geoffrey David Baines, both of Cheshire, United Kingdom; John Talbot Boys, Auckland, New Zealand

[73] Assignee: EA Technology Limited, Chester, United Kingdom

[21] Appl. No.: 09/125,307

[22] PCT Filed: Feb. 17, 1997

[86] PCT No.: PCT/GB97/00441

§ 371 Date: Nov. 25, 1998

§ 102(e) Date: Nov. 25, 1998

[87] PCT Pub. No.: WO97/30509

PCT Pub. Date: Aug. 21, 1997

[30] Foreign Application Priority Data

Feb. 19, 1996 [GB] United Kingdom .................... 9603454

[51] Int. Cl.⁶ ........................................................ B02P 1/26
[52] U.S. Cl. ............................................................ 318/778
[58] Field of Search ..................................... 318/727, 767, 318/768, 778, 781, 786, 785, 789, 794, 795–798, 825, 826, 812, 816–817, 800, 803, 804, 430–434

[56] References Cited

U.S. PATENT DOCUMENTS

| 3,673,480 | 6/1972 | Johnstone | 318/768 |
| 4,642,545 | 2/1987 | Lewus | 318/729 |
| 4,681,191 | 7/1987 | Ikejima | 187/119 |
| 4,792,740 | 12/1988 | Smith | 318/768 |
| 5,300,870 | 4/1994 | Smith | 318/768 |

FOREIGN PATENT DOCUMENTS

| 54-105714 | 8/1979 | Japan . |
| 60-066685 | 4/1985 | Japan . |
| 63-314183 | 12/1988 | Japan . |
| 1-110081 | 4/1989 | Japan . |
| 2 223 895 | 4/1990 | United Kingdom . |

*Primary Examiner*—William M. Shoop, Jr.
*Assistant Examiner*—Rina I. Duda
*Attorney, Agent, or Firm*—Westman, Champlin & Kelly, P.A.

[57] ABSTRACT

An electric induction motor can be given a kick start without excessive current drain on the supply by first connecting a unidirectional supply to a winding of the motor to build up a stationary rotor flux and then applying a starting current to another winding of the motor to produce a stator flux at an appropriate angle (between 0° and 180°) with the stationary rotor flux. Once the motor has begun accelerating the normal running supply can be connected. This starting current may be derived from a capacitance which is charged up during the period of establishing the stationary rotor flux.

17 Claims, 3 Drawing Sheets

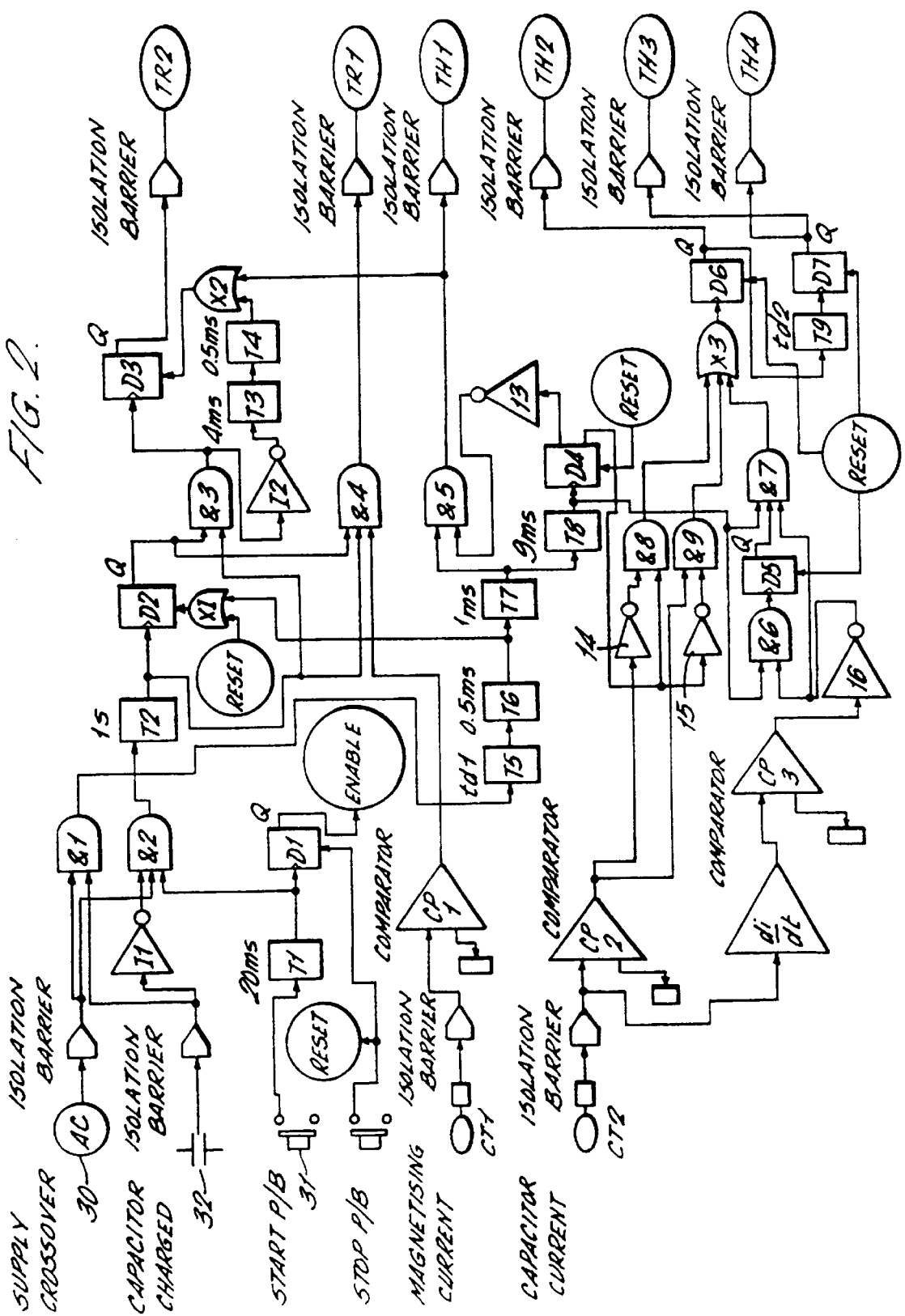

ELECTRIC MOTOR STARTING CIRCUIT

The present invention relates to a starting circuit for an electric induction motor, and is particularly directed to starting a multi-phase motor having a plurality of phase windings to be energised from an electricity supply.

Starting an induction, or asynchronous motor can produce problems because of the current surge drawn by the motor during acceleration of the rotor to rated speed. This is especially a problem for motors connected at sites relatively remote from an electricity supply substation, where the resulting current surge can produce a local reduction in the supply voltage. This arises because of the so called "weakness" of the distribution network providing a significant source impedance. As a result, the size of electric motor that can be connected to a supply for direct on line starting is often restricted by the electricity supplier, even though the supply distribution network would be quite able to support a relatively larger motor during continuous operation.

When the motor is connected to a load requiring a high breakaway torque, the problem is magnified as the duration of the initial surge current drawn by the motor is extended. In fact in extreme cases, the supply distribution network may be unable to supply the full surge current required to generate the required breakaway torque in the machine, so that the motor stalls and fails to start.

There are a number of known solutions to the above problem of high starting currents in electric motors. One is simply to reinforce the distribution network, i.e. provide larger conductors and transformers so that any voltage reduction due to the current surge is minimised. This is obviously extremely expensive and will result in the distribution network having over capacity for steady loads. It is possible to provide electric motors with variable speed drives so that initial starting surges can be reduced by starting the machine at low speed. Power factor correction can also reduce initial current surges. Motors may be arranged to start up on reduced supply voltages but if this is done, the starting torque is reduced. Mechanical clutches may be used to reduce the breakaway torque on start up. Motor modifications such as increased rotor resistance, may be used to alleviate the starting problem.

According to one aspect, the present invention provides a starting circuit for an electric induction motor having a plurality of windings to be energised from an electricity supply, said phase windings having at least three terminals for connection to the supply, the circuit comprising first switching means arranged and controllable to conduct a unidirectional current derived from said supply between a first combination of said terminals to establish a stationary rotor flux in the rotor of the motor, second switching means arranged and controllable to supply a starting current between a second combination of said terminals selected to generate a stator flux at an angle between 0° and 180° to said stationary rotor flux, and switch control means responsive to a motor start signal to control the first switch means to conduct said unidirectional current for a period sufficient to establish said stationary rotor flux, and to control the second switching means to initiate supply of said starting current at the end of said period to provide a starting torque for the motor.

This starting circuit can be arranged to provide a very high starting torque but without drawing a correspondingly high surge current from the electricity supply during start up. During an initial period, the first switching means establishes a stationary rotor flux by directing the unidirectional current between a first combination of the terminals, e.g. through one of the phase windings of a delta connected three phase motor. Only after a substantial stationary rotor flux has been established, is a starting current delivered by the second switching means. This starting current is delivered to a second combination of the terminals to produce a stator flux at an appropriate angle to the pre-existing rotor flux. In one embodiment, energy is stored in an electrical energy storage device and, when the stationary rotor flux has been established, this stored energy is then released between the second combination of terminals e.g. through another phase winding of a three phase motor, to generate the starting torque.

It will be appreciated that this starting torque can be a maximum if the angle between the stationary rotor flux is at 90° electrical to the stator flux from the starting current.

Once the initial high torque has been produced in the motor in this way, and the motor has begun to speed up, the normal supply can be connected to the phase windings of the motor to complete the acceleration of the motor and provide for normal running.

Preferably, the energy storage device is a capacitance and said first switching means is arranged to charge said capacitance during said period sufficient to establish said rotor flux. Then, said first switching means may comprise a first switch connected to be in series with said first combination of terminals, to conduct, when closed, said unidirectional current from said supply, and a freewheel diode in series with said capacitance; said capacitance being connected via said freewheel diode to be in parallel with said first combination of phase terminals; and said switch control means being arranged to operate said first switch repeatedly to interrupt said unidirectional current from the supply so that said capacitance is charged via said freewheel diode when said unidirectional current is interrupted.

Conveniently, said switch control means includes a first current sensor to sense the magnitude of said unidirectional current and is responsive to said first current sensor to open and close said first switch to maintain a desired maximum magnitude of said unidirectional current.

In this way, a predetermined maximum unidirectional current can be maintained during this magnetising period. The repeated operation of said first switch required to control the unidirectional current through the phase winding acts as a chopper which in combination with the freewheel diode permits the energy storage capacitance to be charged up to a relatively high voltage.

Preferably, said first switching means comprises a second switch connected in series with said freewheel diode and said switch control means is arranged to open said second switch when said second switching means is controlled to discharge said capacitance.

Preferably also, said second switching means comprises a third switch arranged to connect, when closed, the capacitance across said second combination of phase terminals; and said switch control means is arranged to terminate operation of said first switch leaving it open and then to close said third switch to discharge said capacitance.

Conveniently, the circuit includes a running capacitance and is arranged to energise the plurality of phase windings of a three phase motor during normal running from a single phase a.c. supply using the running capacitance.

In another aspect, the invention provides a method of starting an electric induction motor having a plurality of phase windings, comprising delivering a controlled current to the motor to establish a stationary rotor flux in the motor, and then delivering a starting current to the motor to produce a stator flux at between 0° and 180° to the stationary rotor flux to produce a motor starting torque. The starting current may be delivered by connecting the motor to the running supply.

Instead, the running supply may be connected after delivery of the starting current to allow the rotor to begin accelerating before the running supply is connected. Then, the energy for said starting current may be accumulated in a storage device prior to delivery of said starting current; and is preferably accumulated during delivery of said controlled current to establish the stationary rotor flux.

Examples of the present invention will now be described with reference to the accompanying drawings in which:

FIG. 2 is a functional logic diagram of the switching control circuit of FIG. 1;

Figure 1:
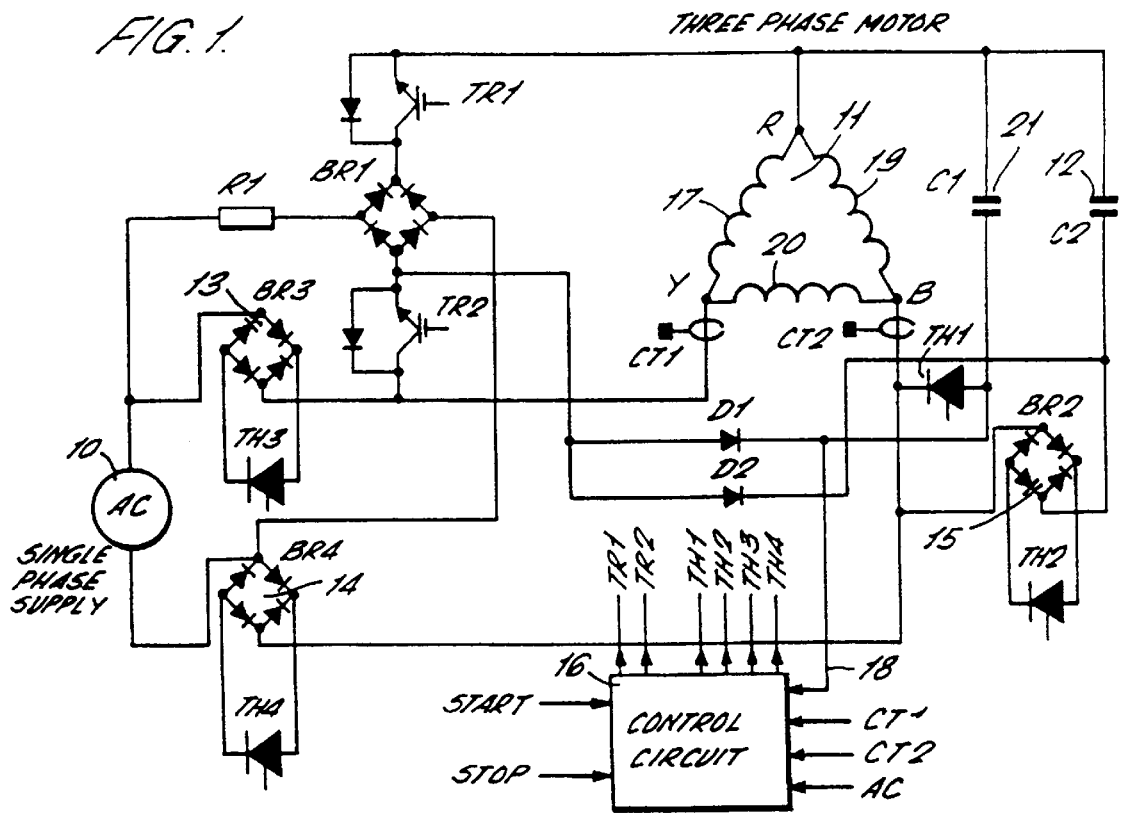
FIG. 1 is a schematic circuit diagram of a starting circuit embodying the present invention connected to a three phase motor arranged for operating from a single phase AC supply.

When an electric motor is started by directly connecting the running supply, electrical energy must be delivered from the supply both to build up the kinetic energy of the motor and motor load as the motor speeds up, and to provide the magnetising energy in the rotor of the motor. Also, when the motor is running slowly below rated speed, high currents are drawn because of the negligible back e.m.f. from the slowly spinning rotor and the poor alignment of the rotor and stator fluxes.

Embodiments of the present invention are designed to draw a controlled current from the supply for a period of time before starting the motor, and to use this current both to build up the magnetising energy in the rotor of the motor and to derive a store of electrical energy which can be used to provide a substantial contribution to the kinetic energy requirement of the motor when speeding up.

In the case of a delta connected three phase motor, the rotor magnetising energy is supplied by driving a unidirectional current through one of the phase windings of the motor stator. It is known that rotor flux builds or falls slowly with a predetermined time constant dependent only on the rotor self inductance and the rotor resistance. The rotor time constant of a typical 1.5 kW motor may be about 100 mS. Accordingly, in order to build up the rotor magnetising flux it is necessary to apply the magnetising current through the one phase winding of the machine for a period longer than the rotor time constant.

At the same time as building up the rotor flux, electrical energy is stored for delivery to another phase winding of the stator at an appropriate electrical angle to the phase winding used to build up the flux in the rotor. Once adequate flux has been built up, and adequate electrical energy stored, the stored energy is delivered to the second phase winding. Due to the relatively slow decay of the rotor flux, substantial mechanical force is applied to the rotor due to the interaction of the current produced in the second phase winding and the rotor flux previously generated. If sufficient electrical and magnetic energy has been stored, this mechanical force can have the effect of establishing a large starting torque in the machine to overcome any breakaway resistance, and to rapidly begin the acceleration process of the motor.

Then, once the motor has begun to accelerate, the normal supply can be established to all phases of the motor to continue the acceleration process and maintain proper running.

It will be understood that in the case of a three phase machine, the electrical angle between the rotor flux established by a current in one stator winding, and the stator flux produced by the current delivered from the electrical storage device to a second winding will be 120°. Although this is not the optimum value (90°) it is still sufficient to establish a large starting torque. Of course, once the rotor begins to rotate, the electrical angular difference between the rotor flux and the stator flux begins rapidly to reduce towards zero.

By making appropriate selections of the unidirectional current used to provide the magnetising flux in the rotor and the size of and voltage on the electrical storage device, it is possible to adjust the circuit to suit a variety of electric motors and loads.

Referring now to FIG. 1, a practical circuit is illustrated for starting a three phase induction motor supplied from a single phase supply.

For normal running of the motor, after start up, the single phase supply 10 is connected directly across the Yellow and Blue phase terminals (Y and B) of the motor 11. A running capacitor 12 is then also connected between the Blue and Red phase terminals (B and R). To provide these connections, bi-directional electronic switch devices 13 and 14 are used to connect the supply 10 to the Yellow and Blue phases respectively and a further bi-directional switch device 15 is used to connect the running capacitor 12 between the Red and Blue phases. Each of the bi-directional switch devices 13, 14 and 15 comprises a bridge rectifier of diodes with a thyristor connected across the two output nodes of the bridge. The bi-directional switch is conducting when the respective thyristor is fired and maintained in a conducting state. Bi-directional switch devices of this kind are well known in the art. The thyristors controlling the bi-directional switches 13, 14 and 15 are thyristors TH3, TH4 and TH2 respectively.

When the motor illustrated in FIG. 1 is first started, thyristors TH3, TH4 and TH2 are all non conducting so that the respective bi-directional switches 13, 14 and 15 are also non conducting.

During the starting sequence, unidirectional current is supplied across the Red and Yellow phases of the motor 11 by a further bridge rectifier BR1 connected in series with a resistor R1 across the single phase supply 10. The unidirectional current supply from the output side of the rectifier BR1 is connected via transistor switches TR1 and TR2 respectively to the Red and Yellow phase terminals of the motor 11.

The transistors TR1 and TR2 are controlled from a control circuit 16. On receipt of a start signal, control circuit 16 closes TR2 and TR1 so that current begins to flow through the phase winding 17 of the motor 11 between the Yellow and Red phase terminals. The control circuit 16 monitors the current flowing through the phase winding 17 by means of a current sensing device (e.g. a Hall effect current transducer) CT1. The control circuit 16 operates to maintain the current flowing in the phase winding 17 substantially constant by controlled switching of switch TR1. The switch TR1 is switched off when the sensed current in winding 17 exceeds a predetermined value and is switched on again when the current falls below a second lower predetermined value. Throughout this period, the control circuit 16 maintains switch TR2 turned on.

The running capacitor 12 (C2) is connected via a series diode D2 across the winding 17, so long as switch TR2 is turned on. A starting capacitor 21 (C1) is also connected via another series resistor D1 across the winding 17.

The series diodes D1 and D2 are arranged as freewheel diodes so that, the current flowing in the winding 17 can continue to flow, via the diodes D1 and D2 to charge the respective capacitors C1 and C2, whenever switch TR1 is turned off. As a result, the repeated switching of switch TR1 to maintain and control the unidirectional current through the winding 17, is used to charge up the capacitors C1 and C2 in a manner known in the field of d.c. regulators and power supplies. In effect, the circuit is using the leakage inductance of the phase winding 17 as a flyback inductor to charge up the capacitors C1 and C2 via the freewheel diodes D1 and D2.

As mentioned above, it is important that the starting period when unidirectional current is being supplied to phase winding 17 and the capacitors C1 and C2 are being charged is of sufficient duration to ensure adequate magnetisation of the rotor of the motor, and to ensure an adequate charge of electrical energy has been stored in the capacitors for use subsequently in generating a required starting torque. For any particular motor installation, the value of the d.c. current supplied to the winding 17, under the control of the control circuit 16, can be set. Also, the size of the capacitor C1 can be chosen to ensure that sufficient electrical energy is accumulated in the capacitor, and the capacitor is charged up to an appropriate voltage. The frequency of switching of the switch TR1 is controlled by selecting the value of series resistor R1. The value of the running capacitor C2 will normally be determined by other considerations to ensure proper running of the motor from the single phase supply once acceleration has been completed.

In the arrangement shown in FIG. 1, the duration for which the unidirectional current is supplied through the winding 17 is controlled by monitoring the voltage accumulating on capacitor C1, e.g. via a line 18 to the control circuit 16. A maximum voltage for the capacitor C1 will normally be set to be well within the breakdown limits of the machine and the associated control circuitry. Within these limits, the maximum voltage setting in the control circuit 16 and the size of the capacitor C1 can be selected to ensure that adequate flux is built up in the rotor of the machine and adequate electrical energy is stored in the capacitors C1 and C2 as required.

When control circuit 16 senses that the voltage on capacitor C1 has charged up to the preset maximum value, repeated switching of switch TR1 is stopped and the switch is held turned off. When the magnetising current in the phase winding 17 falls close to zero switch TR2 can also be turned off, thereby isolating diodes D1 and D2 from the phase terminals of the motor. At the same time, the control circuit 16 fires a thyristor TH1 which connects capacitor C1 between the Red and Blue phase terminals of the motor to discharge into phase winding 19. The resultant interaction between the magnetic flux in the rotor produced by the magnetising current in winding 17, and the current from the capacitor C1 produced in the winding 19 provides a substantial starting torque on the rotor. The control circuit 16 monitors the current delivered by the capacitor C1 to the winding 19 by means of a current sensor or current transformer CT2. When this monitored capacitor current reaches zero, or a minimum value, the control circuit 16 fires thyristor TH2 to turn on the bi-directional switch 15. This connects the running capacitor C2 to the Blue phase terminal. Since capacitor C2 has not previously been discharged, following charging during the initial magnetising of the motor, the voltage applied by the capacitor C2 to the Blue phase terminal will reverse bias the thyristor TH1, commutating it to turn off.

Once thyristor TH1 has been turned off, thyristors TH3 and TH4 can be fired to turn on bi-directional switches 13 and 14 to connect the single phase supply 10 directly across the phase winding 20 between the Yellow and Blue phase terminals. Capacitor C2 remains connected between the Red and Blue phase terminals and functions as the running capacitor of the motor in the known Steinmetz configuration.

It should be noted that thyristors TH3 and TH4 should be fired at the correct phase orientation of the supply to ensure the torque applied to the rotor is in the right direction to continue the acceleration of the motor to full running speed. Instead of the thyristor, rectifier bridge combinations, illustrated in FIG. 1, for the bidirectional switches 13, 14 and 15, any other bidirectional switching device may be employed, such as inverse parallel connected thyristors, or triacs.

The operation of the control circuit 16 can be understood in more detail from FIG. 2 which is a functional logic diagram illustrating the circuit.

The main aim of the starting circuit described is to allow the motor or other rotating machine to be connected to the mains supply. It is necessary, therefore, to produce an accurate and repeatable start sequence. This sequence can be synchronised to the mains supply to enable connection of the supply at the correct point on the waveform.

In FIG. 2, the starting sequence is synchronised to the crossover point of the mains supply waveform by a crossover detector 30. A start push button 31 fires a timer T1 to generate a 20 mS pulse. This timer eliminates any false signals from contact bounce in the push button 31. A latch D1 is set on detection of the 20 mS pulse from timer D1 to provide a general enable signal. This signal is used to lift vetos on all the output signals directly interfacing power control switch devices.

When the motor is started, the voltage on capacitors C1 and C2 in FIG. 1 will normally be low, i.e. below a set point, so that the signal from the capacitor charge detector 32 in the diagram of FIG. 2 is low and the output from inverter I1 is high. Thus, AND gate &2 goes high in response to the first crossover during the 20 mS pulse from the timer T1.

AND gate &2 triggers a timer T2 which is set for approximately 1 second. This defines the maximum duration for the magnetising and capacitor charging part of the sequence. This timer is included to prevent overloading the power switch devices, the motor or any in line resistors in the event that capacitors C1 and C2 do not reach the required voltage.

When timer T2 is activated, latch D2 is set and transistor TR2 is turned on via AND gate &3 and latch D3. Latch D2 can be reset either by an overall system reset or by the output pulse of a timer T6 which is involved in the control sequence for the thyristors TH1, TH2, TH3 and TH4. As explained previously, transistor TR2 provides a flywheel path for the magnetising current through the winding 17 to flow either back to the supply when the chopper switch TR1 is on, or into the capacitors C1 and C2 when switch TR1 is off. Therefore, switch TR2 must remain on when any current is flowing in the magnetising circuit through winding 17 during the start up procedure. Otherwise, destructive voltages will be developed across switch TR2. Timers T3 and T4 are triggered, via inverter I2, when the output of AND gate &3 goes low on resetting of the latch D2 (or when timer T2 times out). Thus, transistor TR2 is left turned on for some 4 mS after D2 is reset, until the pulse generated by timer T4 is fed to reset D3 via the OR gate X2. Latch D3 can also be reset via the OR gate X2 when thyristor TH1 is fired.

When latch D2 is set and timer T2 has not timed out, transistor switch TR1 is controlled via AND gate &4 by the output of a comparator CP1 which compares the magnetising current sensed by current transformer CT1 with a threshold value. Thus, transistor TR1 is turned on whenever the sensed magnetising current falls below a threshold and is turned off whenever the current is above a threshold. Generally, the thresholds will not be the same to provide for appropriate hysteresis and to control the switching frequency.

With repeated switching of transistor switch TR1, and transistor switch TR2 held turned on, flux builds in the rotor and capacitors C1 a C2 are charged up as explained above. When the voltage on capacitor C1 reaches a threshold, AND gate &1 is enabled and the next supply crossover triggers timer T5. T5 provides an adjustable delay so that the thyristor firing sequence can be set for optimum phase orientation of the supply when the supply is ultimately connected for normal running of the machine. After the delay ($t_{d1}$) provided by timer T5, timer T6 is initiated to reset latch D2 via the OR gate X1, disabling further switching of transistor switch TR1 and in due course turning off switch TR2 as explained above. Timer T7 is initiated when timer T6 times out and fires thyristor TH1 via AND gate &5, provided by then latch D4 has not been set. Latch D4 is set by the pulse from timer T8 which is initiated when timer T7 times out. Thus, latch D4 and inverter 13 permit AND &5 to fire the thyristor only if it has not already just been fired.

S The 0.5 mS delay provided by timer T6 ensures that switch TR1 is turned off before thyristor TH1 is fired. The 1 mS delay produced by timer T7 ensures that current from the capacitor C1 is established in winding 19 before the firing control circuitry for thyristor TH2 is enabled.

As can be seen from FIG. 2, thyristor TH2 is fired when latch D6 is set by any of three signals supplied to OR gate X3. The first signal is derived from AND gate &8 which is generated if comparator CP2 detects the current delivered by capacitor C1 falling to zero before timer T8 has timed out. This would indicate that the capacitor C1 has delivered all its energy to winding 19.

The second signal to OR gate X3 is derived from AND gate &9 and is produced if timer T8 times out before comparator CP2 indicates that the current from capacitor C1 has fallen to zero. This provides a maximum delay before proceeding with firing thyristor TH2.

The third signal to the OR gate X3 is produced if the rate of change of current from capacitor C1 reaches zero before timer T8 times out. This occurs, if the rotor of the motor has rotated sufficiently to bring the rotor flux into alignment with the stator flux produced by current in the winding 19, so that thereafter energy begins to return to the capacitor C1. In FIG. 2, an integrator 33 monitors the slope of the capacitor current measured by current transformer CT2 and a comparator CP3 compares the measured slope with a threshold. Whilst the slope is negative, indicating a declining current, the output of comparator CP3 is low so that AND gate &6 triggers latch D5, assuming timer T8 has not yet timed out. AND gate &7 will then pass a thyristor firing signal to OR gate X3 when the output of comparator CP3 first goes high (as the slope reaches about zero), so long as timer T8 has still not timed out.

Once thyristor TH2 has been fired, a timer T9 providing adjustable delay $t_{d2}$, triggers latch D7 to fire thyristors TH3 and TH4. The delay set by timer T9 allows thyristor TH1 to be commutated off by the firing of thyristor TH2, before thyristors TH3 and TH4 are fired. These two latter thyristors connect the motor supply and may be triggered continuously to maintain a continuous supply to the motor or can be repeatedly triggered at predetermined points on the supply waveform to allow mains voltage control of the motor supply if required.

Figure 3:
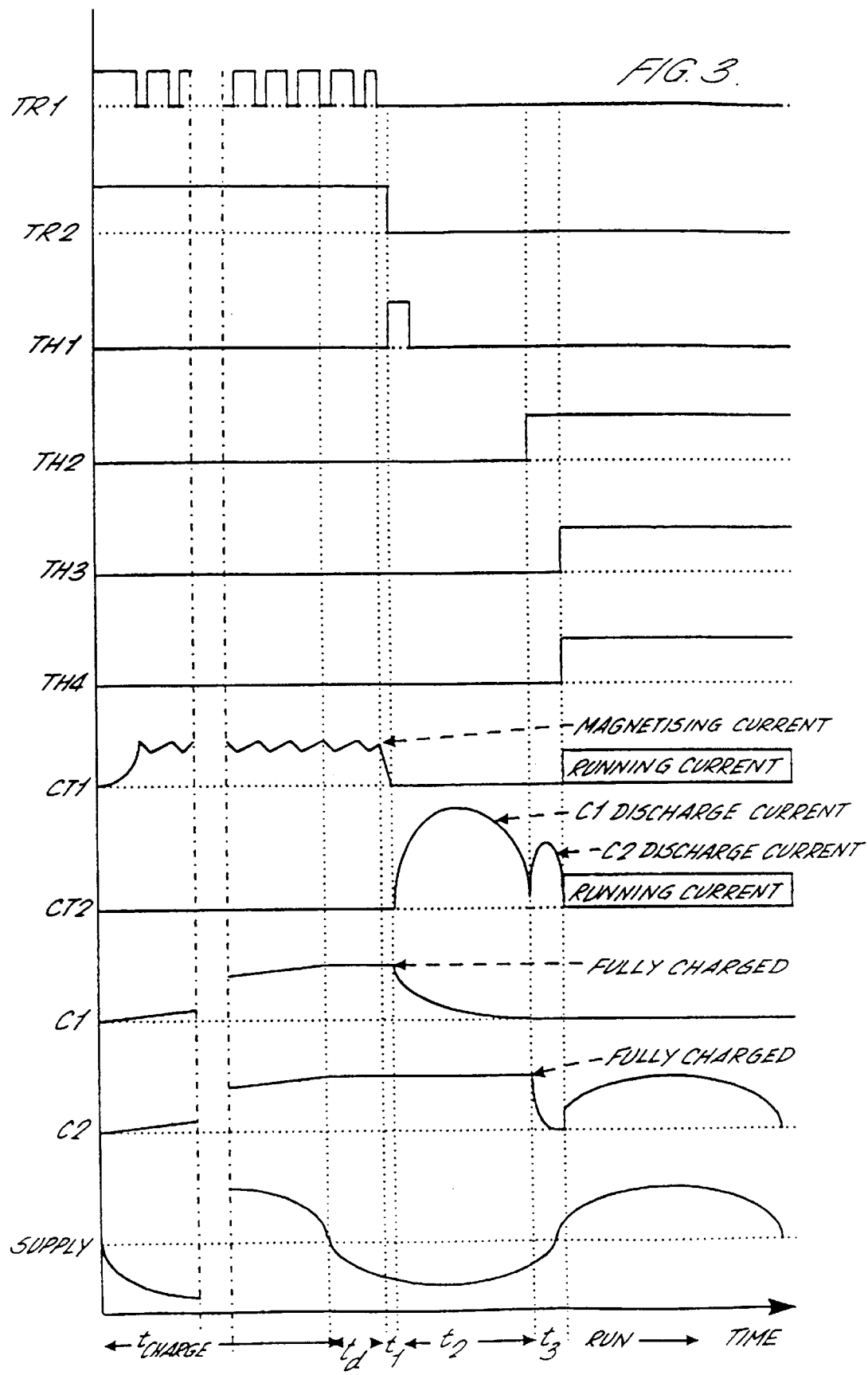
FIG. 3 is a timing diagram illustrating the operation of the circuit.

FIG. 3 is a timing diagram illustrating the operation of the various switching devices TR1, TR2, TH1–TH4, the resulting current flows measured by sensors CT1 and CT2, the voltages on the capacitors C1 and C2, and the current drawn from the supply. The times indicated are:

$t_{charge}$=The time taken for the capacitors to reach the desired voltage, and for the rotor flux to be established.

$t_d$=The delay time from supply crossover detection before initiating the start sequence.

$t_1$=The time allowed for the stator magnetizing current to decay.

$t_2$=The duration of discharging capacitor C1.

$t_3$=The time required for capacitor C2 to discharge and commutate thyristor TH1 off.

run=Connection to the utility supply.

Figure 4:
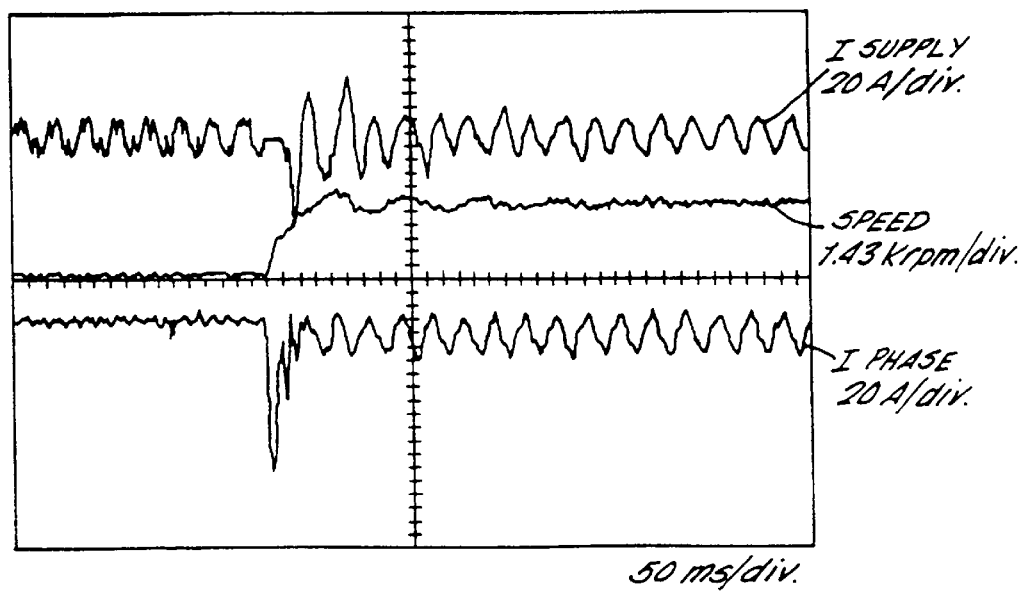
FIG. 4 is a graphical illustration of the performance of the motor starting circuit.

FIG. 4 shows the results of tests conducted on a prototype circuit as shown in FIGS. 1 and 2. The upper trace in FIG. 4 illustrates the supply current from the single phase supply 10. The vertical scale is 20 amps per large division shown. The centre trace illustrates the motor speed and the vertical scale is 1.43 krpm per division. The lower trace illustrates the current in the Red phase terminal of the machine, again with a vertical scale of 20 amps per division. The horizontal scale is 50 mS per division.

For the first 150 mS of the sequence after magnetising current begins to flow on start up, it can be seen that the current in the Red phase is steady at approximately 6 amps d.c. The notches in the corresponding supply current are caused by the switching of transistor switch TR1 maintaining the magnetising current at 6 amps.

At about 157 mS, thyristor TH1 is fired and the supply current drops to zero as TR1 is turned off permanently. The current in the Red phase terminal rises to a peak of approximately 45 amps as capacitor C1 discharges and the machine rapidly accelerates to approximately 850 rpm. When the capacitor current into the Red phase terminal reaches zero the full single phase supply is connected and the machine runs up to rated speed.

The starting transient seen by the supply, as illustrated in the upper trace, lasts for about 90 mS and the peak current drawn is 20 amps for one cycle. This is equivalent to twice the rated full load current of this machine when connected to a three phase supply.

For comparison, a direct on line start with the same machine using only the run capacitors of the machine in a Steinmetz configuration, shows a starting transient for the supply lasting approximately 580 mS with a peak current from the supply of 40 amps.

Further reduction of the transient current drawn on start up using the starting circuit described may be possible with a higher value capacitor or a higher voltage on the capacitor C1.

Although the example of the invention described above with reference to FIGS. 1 and 2 uses is electronic switches, constituted by switching transistors and thyristors, it is conceivable to make an operative circuit using mechanical contactors provided they have sufficient switch timing precision.

Also, although the above example uses the energy stored in the leakage inductance of a machine to charge up the starting capacitor C1 when magnetising current switch TR1 is turned off, other arrangements to provide a store of electrical energy can be envisaged. For example, the magnetising energy from the leakage inductance of the phase winding 17 could be transferred to a snubber capacitor connected across the chopper switch TR1, or mechanical equivalent. A separate circuit would then be provided to charge up the starting capacitor ready for supplying the starting energy to the next phase of the machine when the rotor has been magnetised. It is even conceivable to use a battery to supply the starting current pulse.

Other methods can also be conceived of controlling the supply of unidirectional current through the phase winding of the machine to build up the magnetising flux in the rotor. Instead of repeatedly switching the supply on and off to control the current in the winding, continuous voltage control of the supply could be used, by means of a variac and rectifier.

In the above example, an embodiment of the invention is described employing a delta connected three phase motor supplied from a single phase supply. With the described arrangement a conventional three phase motor can be used in single phase supply connections up to about 60% or 70% of its three phase rating. This avoids the problems associated with single phase motors, especially the need to ensure a starting torque in such motors, which would have zero torque at standstill in the absence of a starting method such as capacitor start, shaded pole or splitphase. Using a three phase motor as described obviates the need for a centrifugal switch or starting winding.

It should be understood, however, that embodiments of the invention may also be used in other motor configurations, such as starting a three phase motor on a three phase supply, or starting a two-phase motor.

Embodiments of the starting circuit can be used with known motor starting arrangements such as star-delta starting, soft-starting and capacitor start/run configurations. Although the embodiment described with reference to the drawings employs a storage device which is discharged to provide the starting current, the starting current could be derived directly from the electricity supply with no previously charged storage device.

Soft-starting circuits and devices are known for providing a controlled start and run-up for electric motors. These not only reduce or control the starting current surge but also control the power factor of the motor. Embodiments of the present invention may be provided by programming conventional soft-starters to provide the required initial rotor magnetising current and subsequent starting current. In this way a high starting torque can be obtained to overcome stiction without high input currents from the supply.

We claim:

1. A starting circuit for an electric induction motor having a plurality of phase windings to be energised from an electricity supply, said phase windings having at least three terminals for connection to the supply, the circuit comprising first switching means arranged and controllable to conduct a unidirectional current derived from said supply between a first combination of said terminals to establish a stationary rotor flux in the rotor of the motor, second switching means arranged and controllable to supply a starting current between a second combination of said terminals selected to generate a stator flux at an angle between 0° and 180° to said stationary rotor flux, and switch control means responsive to a motor start signal to control the first switch means to conduct said unidirectional current for a period sufficient to establish said stationary rotor flux, and to control the second switching means to initiate supply of said starting current at the end of said period to provide a starting torque for the motor.

2. A starting circuit as claimed in claim 1 including an electrical energy storage device and means to charge said storage device, said second switching means being arranged to supply said starting current by discharging electrical energy from said storage device.

3. A starting circuit as claimed in claim 2 including third switching means arranged and controllable to connect the supply to provide an operating supply to the terminals of the motor during normal running of the motor, said switch control means further controlling the third switching means to provide said operating supply only subsequent to said starting torque.

4. A starting circuit as claimed in claim 2, wherein said energy storage device is a capacitance and said first switching means is arranged to charge said capacitance during said period sufficient to establish said rotor flux.

5. A starting circuit as claimed in claim 4, wherein said first switching means comprises a first switch connected to be in series with said first combination of the terminals, to conduct, when closed, said unidirectional current from said supply, and a freewheel diode in series with said capacitance, said capacitance is connected via said freewheel diode to be in parallel with said first combination of phase terminals; and said switch control means is arranged to operate said first switch repeatedly to interrupt said unidirectional current from the supply so that said capacitance is charged via said freewheel diode when said unidirectional current from the supply is interrupted.

6. A starting circuit as claimed in claim 5, wherein said switch control means includes a first current sensor to sense the magnitude of said unidirectional current and is responsive to said first current sensor to open and close said first switch to maintain a desired maximum magnitude of said unidirectional current.

7. A starting circuit as claimed in claim 5, wherein said first switching means comprises a second switch connected in series with said freewheel diode and said switch control means is arranged to open said second switch when said second switching means is controlled to discharge said capacitance.

8. A starting circuit as claimed in claim 5, wherein said second switching means comprises a third switch arranged to connect, when closed, the capacitance across said second combination of said terminals; and said switch control means is arranged to terminate operation of said first switch leaving it open and then to close said third switch to discharge said capacitance.

9. A starting circuit as claimed in claim 5, including a running capacitance, and being arranged to energize the plurality of phase windings of a three phase motor during normal running from a single phase a.c. supply using the running capacitance.

10. A starting circuit as claimed in claim 9, wherein said running capacitance is connected via a further freewheel diode in parallel with said storage capacitance to be charged simultaneously with said storage capacitance.

11. A starting circuit as claimed in claim 10, wherein said third switching means includes a fourth switch to connect said running capacitance directly across a phase winding, and said switch control means is arranged to close said fourth switch to connect said running capacitance across said phase winding subsequent to the discharge of energy from said storage capacitance.

12. A starting circuit as claimed in claim 1 wherein said switch control means is arranged to control said first switching means to supply said unidirectional current for a period longer than the rotor magnetizing time constant, before operating said second switching means to supply said starting current.

13. A method of starting an electric induction motor having a plurality of phase windings, comprising delivering a controlled current to the motor to establish a stationary rotor flux in the motor, and then delivering a starting current to the motor to produce a stator flux at between 0° and 180° to the stationary rotor flux to produce a motor starting torque.

14. A method of starting as claimed in claim 13, wherein the starting current is delivered by connecting the motor to the running supply.

15. A method of starting as claimed in claim 13, wherein the running supply is connected after delivery of the starting current to allow the rotor to begin accelerating before the running supply is connected.

16. A method of starting as claimed in claim 15, wherein energy for said starting current is accumulated in a storage device prior to delivery of said starting current.

17. A method of starting as claimed in claim 16, wherein said starting current energy is accumulated during delivery of said controlled current to establish the stationary rotor flux.

* * * * *